Feb. 3, 1953          C. B. MOORE          2,627,281

FLOW CONTROLLER

Filed Aug. 18, 1945          2 SHEETS—SHEET 1

INVENTOR.
COLEMAN B. MOORE
BY
         ATTORNEY.

Feb. 3, 1953

C. B. MOORE 2,627,281

FLOW CONTROLLER

Filed Aug. 18, 1945

INVENTOR.
COLEMAN B. MOORE
BY
ATTORNEY.

Patented Feb. 3, 1953

2,627,281

UNITED STATES PATENT OFFICE 2,627,281

FLOW CONTROLLER

Coleman B. Moore, Carroll Park, Pa., assignor to Moore Products Co., Philadelphia, Pa., a co-partnership Application August 18, 1945, Serial No. 611,321

4 Claims. (Cl. 137—501)

This invention relates to flow controllers and more particularly to apparatus for maintaining constant flow of pressure fluid.

It is the principal object of the present invention to provide a flow controller capable of maintaining fluid flow constant.

It is a further object of the present invention to provide a flow controller which is capable of maintaining constant flow where the quantity of fluid flowing is very small.

It is a further object of the present invention to provide a flow controller which is capable of maintaining constant flow at low pressures, and including pressures which are subatmospheric.

It is a further object of the present invention to provide a flow controller for maintaining constant flow of liquids or gases.

It is a further object of the present invention to provide a flow controller which will be capable of adjustment for change of flow range.

It is a further object of the present invention to provide a flow controller suitable for use under a variety of conditions where an accurate control of the flow is desired.

It is a further object of the present invention to provide a flow controller having a flow indicator.

It is a further object of the present invention to provide a flow controller which will be particularly useful in connection with pneumatic gaging equipment for making extremely accurate measurements of dimensional differences and providing a high amplifying effect.

Other objects of the invention will be apparent from the specification and claims.

The nature and characteristic features of the invention will be more readily understood from the following description, taken in connection with the accompanying drawings forming part hereof, in which.

Figure 1:
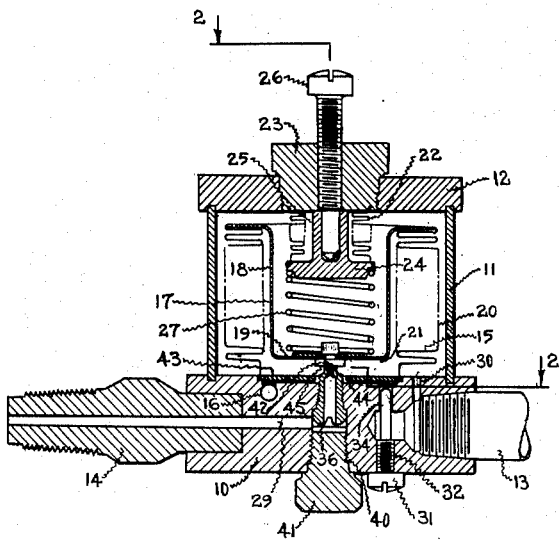
Figure 1 is a vertical sectional view through a preferred embodiment of flow controller in accordance with the present invention and taken approximately on the line 1—1 of Fig. 2.
Figure 2:
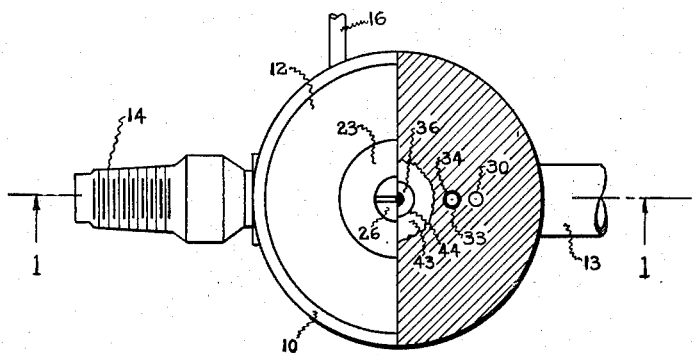
Fig. 2 is a view partly in plan and partly in horizontal section taken approximately on the line 2—2 of Fig. 1.
Figure 3:
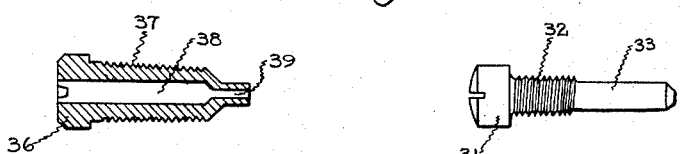
Fig. 3 is a detailed view of a nozzle or restriction member employed with the apparatus of the present invention.
Figure 4:
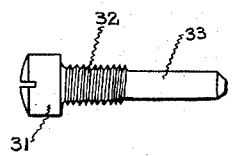
Fig. 4 is a detailed view of one form of metering orifice member employed with the flow controller of the present invention.

It should of course be understood that the description and drawings herein are illustrative merely, and that various modifications and changes may be made in the structure disclosed without departing from the spirit of the invention.

Referring more particularly to Figs. 1 to 4 of the drawings, the flow controller, in accordance with the present invention, preferably includes an enclosing casing consisting of a base section 10, a hollow cylindrical side wall section 11 secured to the base section 10 in fluid tight relationship and an upper casing section 12 to which the side wall section 11 is secured in fluid tight relationship.

The base section 10 has a fluid inlet connection 13 which is adapted to be connected to the fluid supply. The base section 10 also has a fluid delivery connection 14 for the controlled delivery of fluid.

Within the side wall section 11, and between the base section 10 and the upper casing section 12, a flexible metallic bellows 15 of predetermined effective area and spring effect is provided, and is secured at its lower end in fluid tight relationship to the base section 10. The upper end of the bellows 15 has a cup 17 secured thereto in fluid tight relationship. The cup 17 extends downwardly within the interior of the bellows 15, and has a vertical cylindrical wall 18 spaced inwardly with respect to the bellows 13, and a lower horizontal wall 19, spaced above the base section 10. A chamber 20 is thus provided between the side wall section 11 and the exterior of the bellows 15 and a chamber 21 is provided between the interior of the bellows 15 and the cup 17. A fluid connection 16 is provided as a pressure tap.

A flexible metallic sealing bellows 22 is connected at its upper end in fluid tight relationship to a closure plug 23, mounted in the upper casing section 12. The lower end of the bellows 22 is connected to a bellows closure and spring abutment plate 24. The plate 24 has an upwardly extending sleeve portion 25 connected thereto and an adjusting screw 26 mounted in the closure plug 23, extends into the sleeve portion 25 and has the lower end thereof pointed for engagement with the plate 24.

A coil spring 27, of predetermined spring rate, is interposed between the plate 24 and the horizontal wall 19.

A passageway 30 is provided for connecting the fluid inlet connection 13 to the chamber 20 so that the pressure effective at the fluid inlet connection 13 is also effective in the chamber 20. The base section 10 is provided with a metering orifice which may comprise a removable screw member 31, shown in detail in Fig. 4, mounted therein and having a threaded portion 32 for engagement in the base section 10. The screw member 31 has a reduced portion 33 of predetermined diameter which functions with a bore 34 in the base section 10, also of predetermined internal diameter. The space between reduced portion 33 and the bore 34 provides a metering orifice of predetermined size in communication with the supply connection 13 and with the chamber 21.

The base section 10 also has removably mounted therein a restriction nozzle 36 which has a threaded portion 37 for engagement in the base section 10 and is provided with a central opening 38 in communication with a passageway 29, connected to the fluid delivery connection 14. The central opening 38 is in communication with a port 39 of predetermined size. The opening 40 in the base section 10, by which access is had to the nozzle 36, is closed by a plug 41.

The horizontal wall 19 preferably carries a small plate member 42 thereon having a lower flat control surface 45 for cooperation with the port 39 of the nozzle 36 as hereinafter explained.

A baffle plate 43 is provided in the base section 10 having a clearance opening 44 extending around the upper portion of the nozzle 36. The baffle plate 43 serves to prevent turbulence attendant upon the flow of fluid through the metering orifice and to prevent the fluid from impinging on or otherwise modifying the action of the bellows 15 in an undesired manner.

Figure 5:
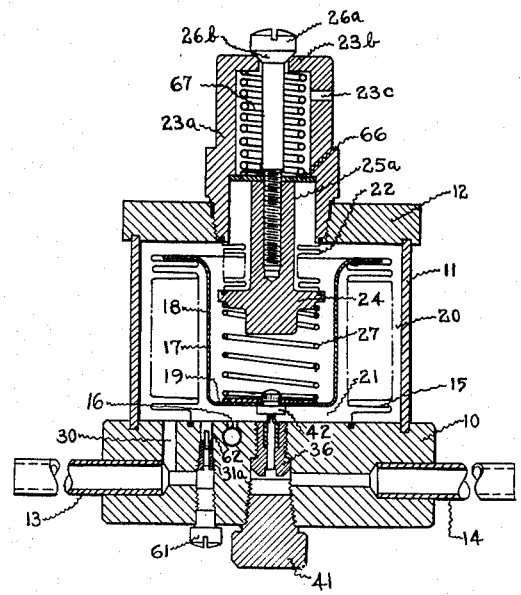
Fig. 5 is a vertical sectional view through a flow controller in accordance with the present invention which is particularly adapted for controlling fluid flow at sub-atmospheric pressures.
Figure 6:
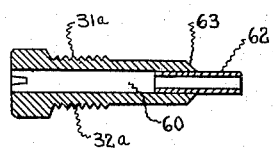
Fig. 6 is a detailed view of another form of metering orifice member employed with the flow controller of the present invention.

The flow controller illustrated in Figs. 5 and 6 is generally similar to that heretofore described and is particularly adapted for but is not limited to very small flows, and controlled fluid flow at sub-atmospheric pressures.

The metering orifice for very small flows preferably comprises a removable screw member 31a, as shown in detail in Fig. 6. The screw member 31a is mounted in the base portion 10 and between the fluid inlet connection 13 and the chamber 21. The screw member 31a has a threaded portion 32a mounting in the base section 10, has a shoulder 63 adapted to seat in the base 10 to prevent undesired fluid leakage, and has a central passageway 60 in communication with the fluid inlet connection 13. A tube 62 of predetermined internal diameter is mounted in the screw member 31a in fluid tight relationship, the interior thereof being in communication with the passageway 60. The opening through the tube 62 functions as the metering orifice. The access opening in the base 10 for insertion and removal of the screw member 31a is closed by a screw plug 61.

For fluid flow at sub-atmospheric pressures, in place of the closure plug 23, a closure cylinder 23a, having an end wall 23b, is mounted in the upper casing section 12. The spring abutment plate 24 has an upwardly extending sleeve portion 25a connected thereto. An adjusting screw 26a has a head 26b, bearing against the outside of the wall 23b of the closure cylinder 23a, and the screw 26a is threaded into the sleeve portion 25a. A spring bearing plate 66 is held in engagement with the upper end of the sleeve portion 25a by a spring 67, the spring 67 engaging the inner face of the wall 23b. A vent opening 23c is provided in the closure cylinder 23a.

Fluid at constant regulated pressure is supplied to the fluid inlet connection 13 from a suitable source and through the passageway 30 applies the upstream or supply pressure in the chamber 20. The area on which the upstream pressure is effective is the effective area of the bellows 15. The fluid pressure in the chamber 20 acts downwardly on the bellows 15 and in the same direction as the spring 27. Fluid passes from the fluid inlet connection 13 through the metering orifice, either between the reduced portion 33 and the bore 34 as shown in Fig. 1, or through the tube 62 as shown in Fig. 5, with a drop in pressure across this metering orifice, and is effective at a reduced pressure in the chamber 21. The fluid passing the metering orifice, as shown in Fig. 1, is directed and guided by the baffle 43 for delivery into the chamber 21, and as shown in Fig. 5 passes directly from the metering orifice to the chamber 21. The fluid pressure in the chamber 21 acts upwardly and is applied on the effective area of the bellows 15.

The horizontal wall 19 and the flat control surface 45 of the plate member 42 carried thereby are thus positioned, in accordance with the forces acting thereon, with respect to the port 39 of the nozzle 36.

With the upstream or supply pressure constant, the differential across the metering orifice is a function of the flow. The differential across the metering orifice is effective for positioning the bellows 15 and the horizontal wall portion 19, as well as the control surface 45 which is positioned by the positioning of the wall 19. The relationships between the various parts are such that any tendency to increase the flow will be effective to restore the control surface 45 to a position to decrease the flow to maintain a constant value. With a fixed metering orifice and with the differential across the metering orifice held constant the flow is controlled to maintain a constant value of the flow.

For flow control under conditions of equilibrium, the system comprising the bellows 15, the cup 17, the wall 19, the control surface 45, and the coil spring 27, take positions such that the upward forces which are acting and the downward forces which are acting are equal. The forces acting downwardly are the upstream or supply pressure in the chamber 20 on the effective area of the bellows 15, which may be identified as $P_1$, and the force of the coil spring 27 which may be identified as $S_1$. The forces acting upwardly are the spring effect of the bellows 15, which may be identified as $S_2$, the pressure effective in the chamber 21 which is the product of the downstream pressure of the metering orifice and the area represented by the effective area of the bellows 15 less the effective area of the port 39, which may be identified as $P_2$, and the product of the delivered pressure effective in the connection 14 and the effective area of the port 39, which may be identified as $P_3$.

The effect on the operation of the delivered pressure at the connection 14 will now be taken up.

If the delivered pressure increases, $P_3$ increases immediately and tends to cause an upward movement of the control surface 45. Also, if the delivered pressure increases, and the flow through the nozzle is not critical, the separation of the control surface 45 from the terminus of the port 39 must likewise increase if the flow is to be maintained constant. By a proper proportioning of the combined spring rate, $S_1$ and $S_2$, of the control spring 27 and the bellows 29, and the effective area of the port 39, the change in the force $P_3$ can be made to produce the necessary change in the separation of the control surface 45 from the terminus of the port 39.

The conditions heretofore referred to have been discussed with a reference to a constant up stream pressure, which is most desirable where compressible fluids, such as gases, are controlled as to flow. With liquids, the constant up stream pressure is not requisite for maintaining constant flow because of the substantially incompressible character of liquids.

The flow controller in accordance with the present invention while not limited to, has been found particularly useful for, very small flows of the order of one standard cubic centimeter of gas of air density per minute or less and for liquids much smaller flows may be provided and controlled.

Figure 7:
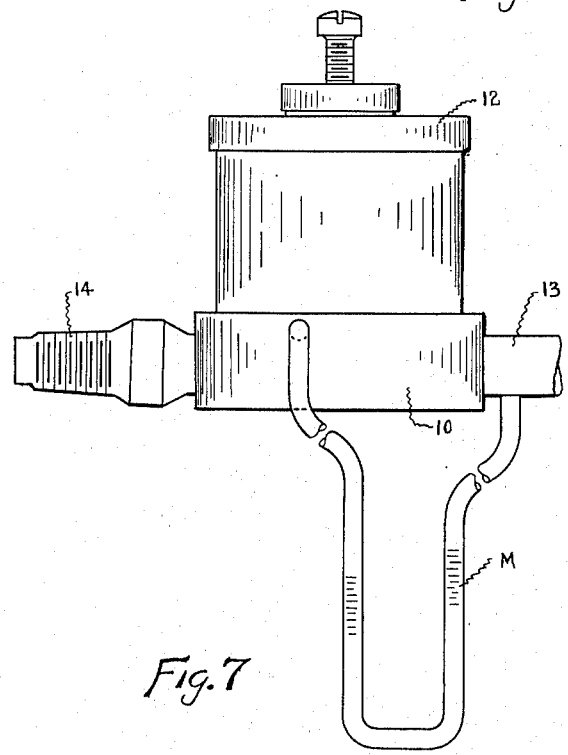
Fig. 7 is a diagrammatic view showing the flow controller with a flow indicator for use therewith.

In Fig. 7 there is illustrated a flow controller in accordance with the present invention, provided with a manometer M, connected on one side to the fluid connection 16, and on the other side to the fluid supply connection 13, for making available, at the exterior of the instrument and at the manometer M, a visual indication of the pressure differential across the metering orifice.

I claim:

1. In a flow controller, a body having a fluid supply passage for supplying fluid and a fluid delivery passage, resilient pressure responsive means, valve means controlled by movement of said pressure responsive means interposed between said fluid passages for controlling fluid flow through such passages, said valve means including a member carried by and forming part of said pressure responsive means, a metering orifice between one of said fluid passages and said valve means, a fluid passageway between one side of said orifice and one side of said pressure responsive means, another fluid passageway connecting the other side of orifice to a portion of the other side of said pressure responsive means, and an additional fluid passageway including a portion of the valve means connecting said other fluid passage to another portion of said other side of said pressure responsive means for applying on said other portion of said side the pressure at said other fluid passage to effect movement of said pressure responsive means.

2. In a flow controller, a body having a fluid supply passage for supplying fluid and a fluid delivery passage, resilient pressure responsive means, valve means controlled by movement of said pressure responsive means interposed between said fluid passages for controlling fluid flow through such passages, said valve means including a valve member carried by and forming part of said pressure responsive means, a metering orifice between said fluid supply passage and said valve means, a fluid passageway between one side of said orifice and one side of said pressure responsive means, another fluid passageway connecting the other side of said orifice to a portion of the other side of said pressure responsive means, and an additional fluid passageway including a portion of the valve means connecting said fluid delivery passage to another portion of said other side of said pressure responsive means for applying on said other portion of said side the pressure at said fluid delivery passage to effect movement of said pressure responsive means.

3. In a flow controller, a body having a fluid supply passage for supplying fluid and a fluid delivery passage, resilient pressure responsive means, valve means including a valve member carried by and forming part of said pressure responsive means and a restricted passageway controlled by movement of said pressure responsive means interposed between said fluid passages for controlling fluid flow through such passages, a metering orifice between one of said fluid passages and said valve means, a fluid passageway between one side of said orifice and one side of said pressure responsive means, another fluid passageway connecting the other side of said orifice to a portion of the other side of said pressure responsive means, and an additional fluid passageway including said restricted passageway connecting said other fluid passage to a portion of said other side of said pressure responsive means for applying on said other portion of said side the pressure at said other fluid passage to effect movement of said pressure responsive means.

4. In a flow controller, a body having a fluid supply passage for supplying fluid and a fluid delivery passage, valve means interposed between said fluid passages for controlling fluid flow through said passages, a metering orifice between said supply passage and said valve means, fluid pressure responsive means for controlling said valve means, said fluid pressure responsive means having a plurality of pressure responsive faces, one of said faces including part of said valve means and being responsive to the differential between the supply and delivery passages, and the others of said faces being responsive to the differential across said metering orifice.

COLEMAN B. MOORE.

REFERENCES CITED

The following references are of record in the file of this patent:

UNITED STATES PATENTS

| Number | Name | Date |
|---|---|---|
| 1,490,654 | Wylie | Aug. 15, 1924 |
| 1,685,205 | Stein | Sept. 25, 1928 |
| 1,699,676 | Rush | Jan. 22, 1929 |
| 1,923,595 | Temple | Aug. 22, 1933 |
| 2,105,127 | Petrol | Jan. 11, 1938 |
| 2,217,635 | Bailey | Oct. 8, 1940 |
| 2,228,315 | Hutton | Jan. 14, 1941 |
| 2,341,394 | Sloan | Feb. 8, 1944 |